United States Patent [19]

Gagne et al.

[11] Patent Number: 4,539,366
[45] Date of Patent: Sep. 3, 1985

[54] SIZING COMPOSITION AND METHOD OF MAKING SAME AND USE THEREOF FOR SIZING TEXTILE YARNS

[75] Inventors: Pierre Gagne, Tassin la Demi Lune; Yvette Girardeau, Fontaines sur Saone; Bernard Pointud, Dardilly, all of France

[73] Assignee: Rhone-Poulenc Specialites Chimiques, Courbevoie, France

[21] Appl. No.: 582,483

[22] Filed: Feb. 22, 1984

[30] Foreign Application Priority Data

Feb. 23, 1983 [FR] France ................. 83 02917

[51] Int. Cl.$^3$ .............. C08L 33/08; C08L 31/04; C08L 75/06
[52] U.S. Cl. ................... 524/507; 524/591; 525/127; 427/366; 428/395
[58] Field of Search ............ 524/507, 591; 525/127

[56] References Cited

U.S. PATENT DOCUMENTS

| | | | |
|---|---|---|---|
| 3,684,759 | 8/1972 | Reiff | 524/507 |
| 3,970,717 | 7/1976 | Muller-Albrecht et al. | 260/859 R |
| 4,150,946 | 4/1979 | Neel | 524/559 |
| 4,276,044 | 6/1981 | Dieterich | 528/71 |
| 4,339,566 | 7/1982 | Rosenkranz et al. | 528/68 |
| 4,394,128 | 7/1983 | Morris | 8/138 |

OTHER PUBLICATIONS

U.S. Defensive Publication T900,088, published 7/18/72, Gerhard Balle et al.

*Primary Examiner*—G. Warren Ivy
*Attorney, Agent, or Firm*—Burns, Doane, Swecker & Mathis

[57] ABSTRACT

The invention provides a sizing composition based on water-soluble polymers, intended for sizing warps of textile yarns and a process for obtaining such compositions and for the sizing of textile yarns. More particularly, provided are compositions comprising, 40 to 90% by weight of a polyester-urethane and 10 to 60% by weight of an acrylic and/or vinyl polymer especially suitable for sizing polyester yarns such as polyethylene terephthalate.

19 Claims, No Drawings

SIZING COMPOSITION AND METHOD OF MAKING SAME AND USE THEREOF FOR SIZING TEXTILE YARNS

BACKGROUND OF THE INVENTION

The present invention relates generally to a new composition comprising a combination of water-soluble polymers and intended for sizing the warps of textile yarns and, especially, polyester yarns and to a process for obtaining such textile sizing compositions.

The invention further pertains to an advantageous process for sizing textile yarns, preferably in an aqueous medium, utilizing the compositions of the invention and to the resultant abrasion resistant yarns suitable for weaving.

In the textile industry, there is an increasing tendency to abandon the prior practice of providing textile yarns with an abrasion resistance which is sufficient for weaving, by applying a high degree of twist to the continuous yarn, of the order of several hundred turns per meter due to a great extent to the high manufacturing costs involved in generating this twist.

Attempts have therefore been made to at least in part replace the degree of twist required by applying to the yarn a sizing whose strength increases proportionately as the twist of the yarn is reduced. At present, a minimum twist of 10 to 15 turns per meter, applied solely by the spinning frame, has been attained. However, these early developed sizing products proved inadequate for imparting an abrasion resistance to the yarn emerging from the spinning frame sufficient to permit weaving under satisfactory conditions.

Furthermore, in recent years an increase in the speed of weaving looms has been attained from 250 to 350 strokes per minute with the result that the warp yarns are subjected to even greater frictional stresses and, accordingly, it has become necessary to employ high performance sizing compositions to achieve satisfactory weaving of such yarns.

Acrylic and/or vinyl homopolymers or copolmers have been recommended as suitable sizing products. However, experience has shown that they are not suitable for the sizing of all textile yarns; in particular, their adhesion to polyester type yarns is poor, and therefore these yarns are not protected adequately to withstand subsequent weaving operations.

Moreover, given the increased speed of current weaving looms, yarn slippage and breakage are observed repeatedly resulting in a reduction in the loom output with yarns treated with such prior art sizing compositions.

It is also known from French Patent No. 2,192,133 and its Certificate of Addition No. 2,213,302 and from U.S. Pat. No. 4,150,946 that it is possible to employ, sulfonated polyesters or anionic polyester-urethanes especially for sizing polyester yarns. These polymers have very good sizing properties for polyester yarns with the result that the weaving conditions and output are excellent. Nevertheless, these products are still not entirely satisfactory when employed for section sizing because it has been found that the individual yarns stick to each other on the beam.

An improved sizing composition, described in French Patent No. 2,291,314 has been proposed, which is in the form of an emulsion or of an aqueous dispersion comprising from 60 to 90% by weight of an acrylovinyl copolymer and from 40 to 10% by weight of a water-soluble polyester. The warp yarns sized with the aid of the foregoing composition have good abrasion resistance during subsequent weaving operations and no slippage or breakage of the yarns are observed, nor fouling of the weaving looms.

However, these compositions still suffer from the disadvantage that they can only effectively be removed by means of an organic solvent (usually trichloroethylene) because of their insolubility in water which, in turn, causes additional technological problems due to the toxicity of the solvent, which is particlarly true with respect to trichloroethylene, and due to the need to further provide a recovery unit for such solvents.

SUMMARY OF THE INVENTION

The problem sought to be solved, therefore, by the present invention is to provide a new universally applicable sizing composition permitting the sizing of any type of polyester yarns, whether textured or untextured or twisted or otherwise, and allowing for any application technique including beam or primary sheet sizing, and which satisfies the following essential requirements:

(1) have good affinity for the textile yarns;

(2) impart sufficient abrasion resistance to the textile yarns for the weaving thereof to be accomplished under acceptable operating conditions;

(3) permit the facile application thereof to yarns by allowing for the use of aqueous solutions;

(4) not foul the combs of the weaving looms;

(5) withstand the output stresses imposed by high-speed weaving looms;

(6) be readily removable with water following completion of weaving operations; and (7) improve the speed of the sizing operation and the output of the weaving looms.

It is, accordingly, a primary object of the present invention to provide a new composition for sizing textile yarns, particularly polyester yarn warps, fulfilling all of the foregoing requirements.

Another object of the invention is the provision of a process for preparing new textile sizing compositions and, more specifically, advantageously selecting and modifying the components thereof to achieve predetermined properties in the components and resulting compositions, including excellent water solubility, suspendability, yarn adhesion, abrasion resistance, removability and thereby overcoming the disadvantages associated with prior art sizing compositions.

A still further object of the present invention is to provide a process for sizing warps of textile yarns utilizing the novel compositions provided hereby to prepare sized warps suitable for high-speed weaving.

These and other similar objects, advantages and features are accomplished according to the products, compositions and processes of the invention comprised of novel textile sizing compositions derived from mixtures of specially prepared anionic polyester-urethane polymers and polymerized acrylic monomers, and methods of sizing yarns therewith and the resultant sized yarns.

DETAILED DESCRIPTION OF THE INVENTION

More specifically, the present invention comprises a composition in the form of an aqueous solution for sizing warps of textile yarns, said composition comprising:

(a) an anionic polyester-urethane having a plurality of polyester blocks therein derived from at least one chain formation of units of the formulas (I) and (II) said blocks being joined together by groups of the formula (III)

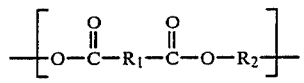 (I)

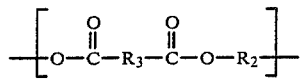 (II)

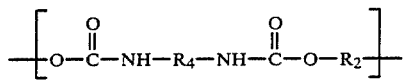 (III)

wherein:

R$_1$ is a divalent radical represented by a saturated hydrocarbon radical (C$_2$–C$_8$, e.g., ethylene, tetramethylene, hexamethylene or octamethylene) or an unsaturated aliphatic hydrocarbon radical (C$_2$–C$_4$, e.g., vinylene or 2,3-propenylene) or a monocyclic aromatic radical (C$_6$–C$_{10}$, e.g., o-phenylene, m-phenylene or p-phenylene);

R$_2$ is a divalent radical represented by a saturated aliphatic radical (C$_2$–C$_8$, e.g., ethylene, tetramethylene, hexamethylene, 2,2-dimethylpropylene, 3-oxapentanylene or 4-oxaheptanylene) or a saturated cyclic hydrocarbon radical (C$_3$–C$_{10}$, 3.g., 4-cyclohexylene, or a 2,2-dicyclohexylpropane-4,4'-diyl);

R$_3$ is a divalent radical selected from one of the groups represented by

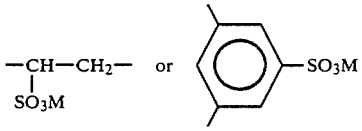

M being an alkali metal (e.g., sodium or potassium);

R$_4$ is a divalent radical selected from the group consisting of hexamethylene, tetramethylhexamethylene,

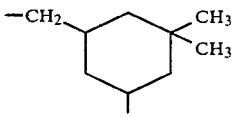

m-phenylene, p-phenylene, 2,4-tolylene, 2,6-tolylene, dicyclohexylmethane-4,4'-diyl, diphenylmethane-4,4'-diyl and naphthalene-1,5-diyl; and (b) a polymer derived from (i) an acrylic monomer of the formula:

$$CH_2 = CX - Y \qquad (IV)$$

wherein X is a hydrogen atom or methyl and Y is selected from one of the following groups:

—COOH

—COOZ

Z being an alkyl radical having from about 1 to 8 carbon atoms.

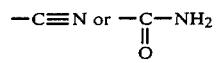

and/or (ii) a vinyl monomer corresponding to the formula:

$$CH_2 = CH - OOCR \qquad (V)$$

wherein R represents a hydrocarbon radical having from about 1 to 20 carbon atoms.

The polymer (b) is most preferably characterized as being soluble in water at a pH greater than 8, having a glass transition temperature (T$_g$) of at least greater than 25° C. and having a hardness, measured according to French Standard NF T 30-016, of greater than 55 seconds.

The preferred anionic polyester-urethanes corresponding to component (a) in the compositions of the invention are selected from those described in U.S. Pat. No. 4,150,946 and are generally obtained by reacting a sulfonated anionic polyester with at least one diisocyanate; the molar ratio of NCO/OH +COOH being less than 1. Advantageously, the foregoing polyesters have a sulfur content of at least 0.5% by weight, an acid number less than 20 mg KOH per gram and a number-average molecular weight of between about 500 and 3,000.

The sulfonated polyester starting material included in the composition of the polyester-urethane component is preprared in a conventional manner by co-condensation of an organic diacid (such as a saturated or unsaturated aliphatic diacid, an aromatic diacid, a diacid containing several aromatic nuclei, or an arylaliphatic acid), or the diesters or anhydrides thereof and sulfonated organic diacids or diesters, with a diol.

The condensation reaction is carried out in a conventional manner, in the presence of a customary polyesterification catalyst, such as, for example, tetraisopropyl orthotitanate.

Presently preferred starting monomers employed to prepare the sulfonated polyesters, are exemplified as follows:

organic diacids: saturated or unsaturated aliphatic diacids and aromatic diacids, such as succinic, adipic, suberic and sebacic acids, maleic, fumaric and itaconic acids, orthophthalic, isophthalic and terephthalic acids, the anhydrides of these acids and their diesters such as the methyl, ethyl, propyl and butyl diesters. Most preferred among the foregoing are adipic acid, and orthophthalic, isophthalic and terephthalic acids;

sulfonated organic diacids: sodium diacid sulfonates or their diesters such as dialkyl isophthalates and dialkyl sulfosuccinates such as sodium dimethyl isophthalate-5-sulfonate or sodium dimethyl sulfosuccinate;

diols: aliphatic glycols such as ethylene glycol, diethylene glycol, dipropylene glycol and the higher homologs, butane-1,4-diol, hexane-1,6-diol, neopentyl glycol and cyclic glycols such as cyclohexanediol or dicyclohexlpropanediol. The presently preferred diols are selected from ethylene glycol and diethylene glycol.

In general, the preferred sulfonated polyesters of component (a) are those having a number-average molecular weight of between about 1,000 and 3,000, an acid number less than 5 mg KOH/g, and a sulfur content of between about 0.8 and 2% by weight, preferably between about 1.2 and 1.8%.

In a second step, the sulfonated polyester obtained is reacted with at least one diisocyanate at a temperature of between 130 and 230° C. This reaction can be carried out in a solid or in a melt, but preferably a melt is employed.

The required quantity of diisocyanate reactant is determined so that the ratio NCO/OH +COOH is less than 1.

The diisocyanates which can be employed are aliphatic, cycloalkane, cycloalkene, aryl or alkylaryl diisocyanates, such as hexamethylene diisocyanate, tetramethylhexamethylene diisocyanate, isophorone diisocyanate, m- and p-phenylene diisocyanates, toluene 2,4-diisocyanate and toluent 2,6-diisocyanate, dicyclohexylmethane 4,4'-diisocyanate, diphenylmethane 4,4'-diisocyanate or naphthalene 1,5-diisocyanate.

Ihe number-average molecular weight of the polyester-urethane thus obtained varies between about 10,000 and 100,000.

The polymers (b) derived from an acrylic monomer and/or a vinyl monomer which form the second component of the compositions of the invention are also products of heretofore known types.

As examples of acrylic monomers capable of being employed, there may be mentioned: acrylic acid, methacrylic acid and their alkyl esters containing from 1 to 8 carbon atoms, acrylamide, methacrylamide, acrylonitrile and methacrylonitrile.

The acrylic monomers which are preferably employed correspond to the formula (IV) depicted above in which X denotes a hydrogen atom or a methyl radical and Y denotes a —COOH group, a —COOZ group in which Z denotes a methyl, butyl or ethylhexyl radical, or a —C≡N group.

As preferred compounds corresponding to the formula (V) depicted above are those in which R is an alkyl radical containing from 1 to 20 carbon atoms such as: a methyl, ethyl, propyl or heptadecyl radical or an aromatic radical such as phenyl.

Vinyl acetate, vinyl propionate, vinyl butyrate, vinyl stearate and vinyl benzoate can also be mentioned as vinyl monomers which are employed preferentially.

The choice of the monomers forming part of the acrylic and/or vinyl polymer, as well as their concentration, influence the physico-chemical characteristics of the polymer obtained.

Generally, use is made of three or even four monomers, selected so that the polymer obtained meets the solubility, thermoplasticity and hardness requirements stated earlier.

The acrylic and/or vinyl polymer should be soluble in water at a pH above 8. Its glass transition temperature should be above 25° C. as measured by means of a Differential Scanning Calorimeter and may vary preferably between 25° and 55° C.

With respect to polymer hardness, it has been found that a value greater than 55 seconds is particularly suitable. Hardness is measured according to French Standard NT 30-106 with the aid of a PERSOZ pendulum. Preferably, a polymer is chosen whose hardness is in the variation range between about 50 and 300 seconds.

Those artisans particularly skilled in the polymer arts will appreciate that the choice of the specific monomers which make it possible to obtain a polymer with the specific requisite properties depends upon a number of variables and factors recognized in the art. Various of these parameters are identified below and the selection of specific aspects within same to optimize polymer properties for the sizing compositions of the invention are detailed it being understood that such preferred embodiments are exemplary only without limitation with respect to other suitable starting materials, relative quantities, polymerization conditions, etc. which will be readily apparent to others skilled in the art.

One of the means of obtaining the desired solubility of the polymer to be produced is to introduce a proportion of at least 5% by weight, expressed relative to the total weight of the monomers employed, of carboxyl functions capable of being provided by acrylic and/or methacrylic acid. Preferably, the acid function proportion does not exceed 20%.

Solubility can also be improved by the selection of monomers of a hydrophilic nature such as, for example, acrylamide or acrylonitrile.

In order that the glass transition temperature (also known as the gamma transition temperature) of the polymer be within the limits specified earlier, the nature and the concentration of the various monomers is chosen so that the glass transition temperature of the polymer corresponds to the following standard theoretical formula:

$$\frac{1}{Tg} = \frac{[A]}{Tg_A} + \frac{[B]}{Tg_B} + \frac{[C]}{Tg_C} \text{ etc} \ldots$$

In the above formula, [A], [B] and [C] denote the weight percentage of the monomers A, B and C, respectively, relative to the total weight of the monomers, $Tg_A$, $Tg_B$, $Tg_C$ correspond to the glass transition temperatures of monomers A, B and C, respectively; and Tg corresponds to the glas transition temperature of the resultant polymer.

In order to obtain a hardness greater than the minimum lower standard defined earlier, it is advisable to employ monomers such as, for example, acrylonitrile, vinyl acetate or methyl methacrylate.

The preparation of the polymer derived from an acrylic and/or vinyl monomer is carried out in a conventional manner according to techniques for polymerization in solution or an aqueous emulsion as well known to those skilled in this art.

The polymerization of the acrylic and/or vinyl monomers results in the production of a polymer emulsion which is converted to a solution by adding a base such as, for example, ammonia, until a pH of between about 7.5 and 10 is obtained.

The aqueous solution of acrylic and/or vinyl polymer which is obtained may contain from 20 to 60% by weight, preferably from 25 to 35%, solids.

Relative amounts of the two components forming the compositions of the invention can range within wide limits. More especially, the relative proportions of each component, expressed as weights of solids may be selected within the following ranges:

from 40 to 90% by weight of polyester-urethane from 10 to 60% by weight of acrylic and/or vinyl polymer.

Sizing performance capabilities of the compositions improve in proportion with an increase in the amount of polyester-urethane, so that preferred compositions within the scope of the present invention usually contain:

from 70 to 90% by weight of polyester-urethane, and from 10 to 30% by weight of an acrylic and/or vinyl polymer.

The compositions of the invention can be produced by direct mixing, with agitation, of the polyester-urethane in an aqueous solution with the acrylic and/or vinyl polymer in the form of an aqueous solution.

The mixing operation is most typically carried out hot, at a temperature ranging from 40° to 70° C., preferably of the order of 50° C.

Agitation is produced with the aid of conventional means of stirring (helix, anchor, gate, etc.).

The compositions may be prepared from their components either immediately before their use for sizing, or in advance of their use, and may be stored. In fact, the compositions of the invention remain perfectly stable under usual storage conditions provided that their pH is controlled and, if appropriate, adjusted to between 4 and 8.5.

The present invention also relates to a process for sizing warps of textile yarns which comprises applying the sizing compositions of the invention as detailed hereinabove in an aqueous medium, using the conventionally applied practice of immersing the yarns in an aqueous bath containing the sizing composition at the required concentration and temperature (which bath will be referred to below as a size bath), then dewatering the said yarns by passing them between rollers and finally drying the sized yarns on heating cylinders and if appropriate with a previous passage through hot chambers; the warp is then ready to be woven.

Illustrative of the foregoing process are the two methods of sizing continuous yarn which are section sizing and primary sheet sizing.

According to the section sizing technique, the yarn is warped before being sized. The warping consists in arranging the yarns to form the warp with a view toward weaving. In this warp, approximately 1.50 to 1.80 meters wide and from 2,000 to 5,000 meters in length, there are 35 to 60 yarns per centimeter.

During sizing, the warp undergoes the following operations:

immersion in a size bath maintained at a temperature on the order of 25° to 30° C.;

dewatering by means of a mangle system in which the pressure applied by the rollers is approximately 3 kg/cm$^2$, but can vary according to the material employed;

drying the warp by passage over a series of heated cylinders, usually 6 in number, whose temperatures vary between 70° and 140° C. To avoid fouling the cylinders, it is preferable that they be covered with a coating of a polytetrafluoroethylene type; and reception onto a beam following the splitting of the warp into several sheets by means of stainless steel rods.

This series of operations is carried out at a speed of between 35 and 65 m/min. The beam will then be mounted on the weaving loom.

Sizing in a primary sheet differs from the preceding method in that warping is not required. It is possible to start either with a beam on which there is a sheet of from 1,000 to 2,000 yarns (6 to 10 yarns per cm) and from 50 to 100,000 meters in length, or with 1,000 reels of yarns for a sheet of 1,000 yarns. In all those instances, the yarns are presented on the sizing machine with a uniform gap between each of them.

Effectuating primary sheet sizing necessitates the following operations:

immersion of the warp in a size bath maintained at a temperature of the order of 25° to 30° C.;

dewatering, by means of a mangle system and in an identical manner to the section sizing method;

drying by passing the sheet successively through two hot chambers where the air is heated in the region of 110° to 150° C., then passage over a series of heated cylinders, usually 5, whose temperatures are 100°–130° C., the drying temperatures being a function of the sizes employed;

reception onto a beam following passage of the yarns through a comb in order to provide spacing between each yarn.

This series of operations is carried out at a speed of between about 100 and 300 m/min.

The beam thus obtained is conveyed to the assembly room to produce a warp intended for weaving.

Sizing thus obtained is generally of a better quality when produced according to the foregoing primary sheet method. Although, of course, the section sizing method yields acceptable sized yarns.

The compositions of the invention can be employed according to the above described techniques and are diluted in water to produce a bath of the required concentration.

Bath concentrations can vary between 5 and 20% by weight of polymer solids with concentrations being determined on the basis of the machinery employed to carry out the sizing cycle and, in particular, the squeezing pressure of the rollers and the quantity and extent of sizing intended to be applied to the yarns. It will be appreciated that the quantity of size deposited is dependent upon not only the ability of the sizing composition to adhere to the yarns to be processed but on the strength of the yarns which is a function of their texturing, their degree of twist and the number of filaments in the unit yarn. The quantity of size to be deposited must be greater the weaker the yarns are, and the less adhesive the size is. Likewise, if the size has a tendency to be removed during weaving, it will be necessary to increase the quantity initially deposited. Generally, an application rate of 3 to 10% of the composition, expressed as solids relative to the weight of the yarn, is sufficient for all applications, including yarns which are the most difficult to size such as those based on polyethylene terephthalate. Depositing a greater quantity is, of course, possible, but offers no real benefits and can even be disadvantageous if it causes the yarns to stick on the beam or fouling of the loom components. The preferred concentration range will, therefore generally be between about 3 and 7% of the compositions based on the weight of the yarn.

The warp yarns sized consistent with the composition and processes of the invention have adequate strength for subsequent weaving operations. The component filaments are correctly bound without evidence of fraying, yarn breakages or fouling of the weaving looms.

Following weaving, the desizing is carried out using water. The textiles are desized by being passed through a bath of water which has been softened by passing same over ion exchange resins to remove the calcium ions. This bath is maintained at a temperature of from 80° to 90° C. and at a slightly alkaline pH ranging from 9 to 10, adjusted by adding sodium carbonate or sodium hydroxide.

In order to remove any oily residues at the same time, it is customary to add to the desizing bath a detergent, which can be an anionic or nonionic surface-active agent, at a concentration of 2 to 5 g/liter.

For the choice of the surface-active agent, reference can be made, among others, to the "ENCYCLOPEDIA OF CHEMICAL TECHNOLOGY - KIRK OTHMER, volume 19" or to various texts in the Surfactant Sciences Series, Marcel DEKKER Inc. - volume 1: "Nonionic Surfactants" by Martin J. SCHICK and volume 7: "Anionic Surfactants" by Warner M LINFIELD or to Mc. CUTCHEON'S publication: "Detergents and Emulsifiers" - International and North America Edition.

Presently preferred are non-ionic surfactants such as a polyethoxylated alkylphenol.

It follows from the preceding description that the sizing compositions of the invention are particularly advantageous for finishing the synthetic fibers of polyethylene terephthalate which are among the most difficult textile fibers to size, but the compositions are also capable of being employed for polyethylene terephthalate fibers mixed with natural fibers or for other fibers as well such as acrylic fibers, polyimide fibers, chlorofibers, polyethylene fibers and polypropylene fibers.

Moreover, it is possible with the present invention to size any type of yarn, whether textured or not, twisted or not and according to any sizing techniques whether section sizing or primary sheet sizing.

A very considerable advantage of these compositions is that they withstand the output stresses of the new weaving looms. It is accordingly, possible to carry out the sizing at higher speeds increasing from 130–140 m/min to 230–250 m/min in the case of a primary sheet sizing, because they dry much more quickly than any of their respective components, which represents a significant energy saving.

Also, sticking of the yarns on the beam is reduced relative to the polyester-urethane alone and the sizing strength is enhanced relative to the acrylo-vinyl polymers.

The following non-limiting examples further illustrate the invention.

Example 1 describes the preparation of a composition of the invention.

Examples 2 and 3, which follow, relate to the sizing of various textile yarns, followed by the weaving operation.

EXAMPLE 1

(a) Preparation of polyester-urethane

The polyester-urethane employed is that describd in Example 4 of U.S. Pat. No. 4,150,946.

(b) Preparation of the acrylic copolymer

The polymerization of the acrylic monomers, namely, butyl acrylate, methyl methacrylate and acrylic acid, is carried out in a conventional manner using an emulsion polymerization technique, in the presence of a polymerization initiation catalyst and a chain length regulating agent.

The emulsifying agent employed is a polyethoxylated alkylphenol sulfate.

The polymerization initiator is a redox system: ammonium persulfate and sodium metabisulfite.

The agent employed to regulate the chain length is tertiary dodecyl mercaptan.

The methodology employed to prepare the composition is as follows:

An autoclave fitted with a stirring system, a temperature recording device, a reflux distillation arrangement and devices for holding and adding monomers, is charged with:

| softened water: | 292 kg |
|---|---|
| emulsifying agent: | 5 kg |

The mixture is stirred and the autoclave is then heated to 70° C.

When the temperature has stabilized, the polymerization initiator is added by means of metering pumps as follows:

1 kg of ammonium persulfate dissolvd in 5 liters of softened water 0.2 kg of sodium metabisulfite dissolved in 2 liters of softened water after which the following ingredients are added by means of the metering pump, over a period of 4 hours, the temperature being kept at 70° C.:

165 kg of softened water 5 kg of emulsifying agent 148 kg of butyl acrylate 124 kg of methyl methacrylate 29 kg of acrylic acid and 1.3 kg of tertiary dodecyl mercaptan.

During the addition of the monomers, the reaction mixture is cooled so as to maintain a temperature of 65° C.

A translucent, low viscosity emulsion containing 40% of dry solids is obtained.

The dilution and the neutralization of the emulsion obtained are then carried out. The emulsion obtained is diluted with a mixture of softened water and ammonia preheated to 80° C., which are added with stirring so as to produce an aqueous solution of the said polymer, with the following properties:

| dry solids: | 25% |
|---|---|
| pH: | 8.2 |

The acrylic copolymer obtained has a glass transition temperature of 27° C. and a hardness of 60 seconds.

(c) Preparation of the composition according to the invention

An autoclave fitted with a stirring system and a temperature recording device is charged with 1,500 kg of an aqueous solution containing 25% by weight of the polyester-urethane described in (a), and 750 kg of an aqueous solution, as obtained earlier in (b), of acrylic copolymers with stirring.

The materials are mixed at 52° C. with stirring.

14 liters of ammonia are then added to bring the pH of the sizing composition to a value of 8. A clear product with a brown-green color is obtained, whose properties are as follows:

| pH measured on a solution containing 15% of dry solids: | 7.9 |
|---|---|
| dry solids: | 25% |
| viscosity at 20° C.: | 56 $c_p$ |
| clear, greenish-brown product. | |

EXAMPLE 2

This example illustrates the sizing and weaving of warps of polyester yarns of 67 decitex, 30 filaments, untwisted and filaments mixed with compressed air in spinning.

A bath containing 16% of dry solids is prepared by dilution with cold or tepid water, with stirring.

This bath is placed in the tank of a TSUDAKOWA sizing machine. On this machine, a warp of 1,500 polyester yarns, distributed over 160 centimeters, is immersed in the sizes bath, then dewatered by passing between two cylinders. Drying is then carried out by passing the warp through two chambers 4.50 m in length heated to 145° C. and ventilated, then over five polytetrafluoroethylene-coated rollers heated at temperatures decreasing from 125° to 110° C. At the exit of the rollers, before the cooling oven, a lubricant (molten wax at 90° C.) is applied by skimming over a roller turning at a low speed. The speed of passage over the sizing machine is 235 m per minute. The size application is close to 5%, the average lubricant content is 0.3%. The foregoing constitutes a sizing designated as "primary sheet", in which four beams are generally produced which must then be assembled to obtain the final weaving warp of approximately 6,000 yarns.

This warp is then mounted on a SULZER double width loom; the latter comprising a projectile loom turning at a speed of 210 strokes/minute. The weaving room is air-conditioned at 62% relative humidity and 23° C.

An excellent weave is then produced, without fraying or filament breakage; the yield is also good and the number of interruptions with the loom is less than two for eight hours of weaving. In addition, no deposit is observed on the loom components; namely, warp-carrier roller, warp-stop rods, links, combs and projectile guiding teeth.

It is also to be noted that there is no sticking between the turns of the yarns forming the beam, this being the case through the end of the beam.

After weaving is complete, the desizing operation is carried out by washing the fabric so that it can undergo dyeing and/or printing operations.

The desizing is carried out in a washing device comprising a system of troughs arranged in a cascade with two washing troughs and four rinsing troughs.

The washing trough bath consists of a solution, heated at 85° C., of:

+2 g/liter of a non-ionic surfactant: a nonylphenol condensed with 6 ethylene oxide molecules per mole of phenol;
+3 g/liter of sodium carbonate in de-ionized water.

The first two rinsing troughs contain de-ionized water heated at 60° C. while those following are filled with water, also de-ionized but not heated.

The speed of passage through the washing device is 30 meters/min.

EXAMPLE 3

The composition of the invention is applied to a textured FT (false twist) polyester yarn of 76 decitex, 24 filaments, twisted at 180 twists per meter.

The sizing is, in this case, produced by a section system. On a SUCKER 7-roller machine, the entire yarn sheet of approximately 5,000 yarns assembled on a single roller placed at the entry of the sizing machine is immersed in a bath containing 6% of dry solids. As in Example 2, the sheet is dewatered by being passed between 2 rollers. Drying is then carried out by passing over 7 rollers, the first 4 of which are coated with polytetrafluoroethylene and heated to temperatures decreasing from 135° C. to 90° C. The speed of passage is 40 m/min, the size concentration obtained is in the region of 6%.

This warp is then placed directly on a rapier loom (SAURE type) turning at a speed of 210 strokes/minute on which, again, weaving results and operating conditions are very good. No yarn damage is observed and the number of breakage interruptions remains at a very low level. Likewise, the deposits on the loom components are virtually non-existent.

While the invention has been described and illustrated with reference to certain preferred embodiments thereof, those skilled in the art will appreciate that various changes, modifications and substitutions can be made therein without departing from the spirit of the invention. It is intended, therefore, that the invention be limited only by the scope of the claims which follow.

What is claimed is:

1. A composition for sizing warps of textile yarns comprising in aqueous solution (a) an anionic polyester-urethane of molecular weight between 10,000 and 100,000 having a plurality of polyester blocks therein derived from at least one chain formation of units of the formulas (I) and (II), said blocks being joined together by groups of the formula (III)

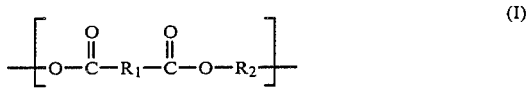

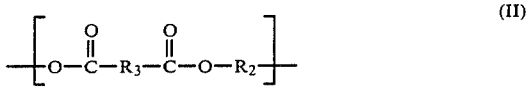

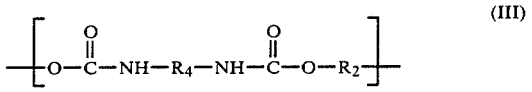

wherein:

$R_1$ is a divalent radical represented by a saturated hydrocarbon radical, an unsaturated aliphatic hydrocarbon radical or a monocyclic aromatic radical;

$R_2$ is a divalent radical represented by a saturated aliphatic radical or a saturated cyclic hydrocarbon radical;

$R_3$ is a divalent radical selected from

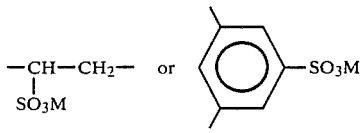

M being an alkali metal;

$R_4$ is a divalent radical selected from the group consisting of hexamethylene, tetramethylhexamethylene,

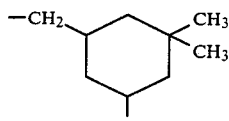

m-phenylene, p-phenylene, 2,4-tolylene, 2,6-tolylene, dicyclohexylmethane-4,4'-diyl, diphenylmethane-4,4'-diyl and naphthalene-1,5-diyl; and (b) a polymer derived from
(i) an acrylic monomer of the formula:

$$CH_2=CX-Y \qquad (IV)$$

wherein X is a hydrogen atom or methyl radical and Y is one of the following groups:

—COOH

—COOZ (Z being an alkyl radical containing 1 to 8 carbon atoms)

—C≡N
or

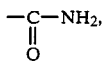

and/or
(ii) a vinyl monomer corresponding to the formula:

$$CH_2=CH-OOCR \qquad (V)$$

in which R is a hydrocarbon radical having from 1 to 20 carbon atoms,
wherein sid composition comprises from about 40 to about 90 weight percent of said polyester-urethane and from about 10 to 60 weight percent of said polymer of (b).

2. A composition according to claim 1, wherein $R_1$ represents ethylene, tetramethylene, hexamethylene, octamethylene, vinylene, 2,3-propylene, O-phenylene, m-phenylene or p-phenylene and $R_2$ represents ethylene, tetramethylene, hexamethylene, 2,2-dimethylpropylene, 3-oxapentanylene, 4-oxaheptanylene, 4-cyclohexylene or 2,2-dicyclohexylpropane-4,'-diyl.

3. A composition according to claim 1, wherein the sulfonated polyester present in the polyester-urethane component is obtained by co-condensation of an organic diacid or the diesters or anhydrides thereof and of a sulfonated organic diacid or the diesters thereof, with a diol.

4. A composition according to claim 3, wherein the organic diacid is a saturated aliphatic diacid selected from the group consisting of succinic, adipic, suberic and sebacic acid, an unsaturated aliphatic diacid selected from the group consisting of maleic, fumaric and itaconic acid, or an aromatic diacid selected from the group consisting of orthophthalic, isophthalic or terephthalic acid.

5. A composition according to claim 3, wherein the sulfonated organic diester is obtained from a dialkyl isophthalate and a dialkyl sulfosuccinate selected from sodium dimethyl isophthalate-5-sulfonate and sodium dimethylsulfosuccinate.

6. A composition according to claim 3, wherein the diol is an aliphatic glycol selected from ethylene glycol, diethylene glycol, dipropylene glycol, butane-1,4-diol, hexane-1,6-diol, or neopentylglycol, or a cycloalkane glycol selected from cyclohexanediol or dicyclohexylpropanediol.

7. A composition according to claim 1, wherein the sulfonated polyester present in the composition of the polyester-urethane has a number-average molecular weight of between 1,000 and 3,000, an acid number less than 20 mg KOH/g, and a sulfur content of between 0.8 and 2%.

8. A composition according to claim 3, wherein the diisocyanate component of said polyester-urethane is hexamethylene diisocyanate, tetramethylhexamethylene diisocyanate, isophorone diisocyanate, o-, m- and p-phenylene diisocyanates, toluene 2,4-diisocyanate and 2,6-diisocyanate, dicyclohexylmethane 4,4'-diisocyanate, diphenylmethane 4,4'-diisocyanate or naphthalene 1,5-diisocyanate.

9. A composition according to claim 8, wherein the diisocyanate is present in a quantity such that the ratio of NCO/OH+COOH is less than 1.

10. A composition according to claim 1, wherein the acrylic or vinyl polymer or acrylic-vinyl polymer is soluble at a pH greater than 8, has a glass transition temperature of between 25° and 55° C. and a hardness of between 55 and 300 seconds.

11. A composition according to claim 1, wherein the acrylic monomer corresponds to the formula (IV)

$$CH_2=CX-Y \qquad (IV)$$

wherein X represents a hydrogen atom or a methyl radical and Y represents a —COOH group, a —COOZ group wherein Z represents a methyl, butyl or ethylhexyl group, or Y represents a —C≡N or a

group.

12. A composition according to claim 1, wherein the vinyl monomer in said polymer of (b) corresponds to the formula (V)

$$CH_2=CH-OOCR \qquad (V)$$

wherein R is an alkyl radical having from about 1 to 20 carbon atoms or an aromatic radical.

13. A composition according to claim 12, wherein the vinyl monomer is selected from vinyl acetate, vinyl propionate, vinyl butyrate, vinyl stearate or vinyl benzoate.

14. A composition according to claim 1, wherein the polymer of (b) is obtained in the form of a solution by adding a base to the emulsion until a pH of between 7.5 and 10 is obtained.

15. A composition according to claim 14, wherein the base is ammonia.

16. A composition according to claim 1, comprising from about 70 to 90% by weight of polyester-urethane and from about 10 to 30% by weight of an acrylic and/or vinyl polymer.

17. A process for preparing a composition according to claim 1 comprising mixing, with agitation, the polyester-urethane in an aqueous solution with the polymer of (b) in the form of an aqueous solution.

18. A process according to claim 17, wherein the mixing is carried out at a temperature of about 40° to 70° C.

19. A process according to claim 17, wherein the pH of the mixture is controlled between about 4 and 8.5.

* * * * *